United States Patent [19]
Cadwell

[11] Patent Number: 4,578,240
[45] Date of Patent: Mar. 25, 1986

[54] NUCLEAR REACTOR FUEL ASSEMBLY SPACER GRID

[75] Inventor: Dennis J. Cadwell, Plum Boro, Pa.

[73] Assignee: Westinghouse Electric Corp., Pittsburgh, Pa.

[21] Appl. No.: 454,927

[22] Filed: Jan. 3, 1983

[51] Int. Cl.$^4$ .............................................. G21C 3/34
[52] U.S. Cl. ..................................... 376/441; 376/442
[58] Field of Search ................. 376/438, 441, 442, 462

[56] References Cited

U.S. PATENT DOCUMENTS

| | | | |
|---|---|---|---|
| 3,380,890 | 4/1968 | Glandin et al. | 376/441 |
| 3,431,171 | 3/1969 | Glandin . | |
| 3,751,335 | 8/1973 | Keith | 376/442 |
| 3,769,159 | 10/1973 | Zinn et al. | 376/441 |
| 4,110,160 | 8/1978 | Hayashi et al. . | |
| 4,163,690 | 8/1979 | Jabsen | 376/442 |
| 4,175,003 | 11/1979 | Beuchel et al. | 376/442 |
| 4,364,902 | 12/1982 | Feutrel | 376/441 |
| 4,411,862 | 10/1983 | Leclerq et al. | 376/441 |

FOREIGN PATENT DOCUMENTS

| | | |
|---|---|---|
| 2823899 | 12/1979 | Fed. Rep. of Germany . |
| 1362546 | 8/1974 | United Kingdom . |
| 1539367 | 1/1979 | United Kingdom . |

Primary Examiner—Charles T. Jordan
Assistant Examiner—Richard Klein
Attorney, Agent, or Firm—D. E. Erickson

[57] ABSTRACT

A nuclear reactor fuel assembly spacer grid having grid straps and a first type of spring clip. The grid straps define standard cells enclosing fuel rods and thimble cells enclosing control rod guide thimbles. The spring clip is bent to widthwise encircle a grid strap and has its two ends welded together. The first type of spring clip is used at a location on a grid strap having a standard cell and an adjacent thimble cell. The spring clip has a spring portion compressibly contacting the fuel rod in the standard cell. The spring clip also has a pair of separated flat portions straddling the control rod guide thimble in the thimble cell so as not to interfere with the guide thimble. The spring clip is made of a material having good radiation stress relaxation properties.

6 Claims, 8 Drawing Figures

NUCLEAR REACTOR FUEL ASSEMBLY SPACER GRID

BACKGROUND OF THE INVENTION

The present invention relates generally to nuclear reactor fuel assemblies and more particularly to an improved grid for spacing fuel rods and control rod guide thimbles which help constitute a fuel assembly.

Nuclear fuel spacer grids are used to precisely maintain the spacing between fuel rods in a nuclear reactor core, prevent rod vibration, and provide lateral support for the fuel rods. Conventional designs of grids for nuclear reactor fuel assemblies include a multiplicity of interleaved straps of egg crate configuration designed to form cells which accept fuel rods (standard cells) and control rod guide thimbles (thimble cells). Slots are utilized to effect an interlocking engagement with adjacent straps. Each standard cell provides support to one fuel rod at a given axial location through the use of relatively resilient springs and relatively rigid protrusions (called dimples) formed into the metal. A peripheral strap (having the same width as the interleaved straps) encloses the interleaved straps to impart strength and rigidity to the fuel assembly. In order to minimize the lateral displacement of fuel rods and to improve the fuel characteristics of an assembly, a number of grids are spaced along the fuel assembly length. These grids are held in place by attachment to the control rod guide thimbles.

Existing unimetallic grids have springs which are integral with the grid strap and are made from a low neutron capture cross-section material. These springs are subject to stress relaxation under irradiation which could lead to fretting failures of the fuel rods.

Existing bimetallic spacer grids employ grid straps, made from a low neutron capture cross-section material, for structural support and use springs mounted thereto, made from a good radiation stress relaxation material, to contact the fuel rods. A "good radiation stress relaxation material" is one which exhibits low stress relaxation during radiation, meaning the material does not suffer a significant loss of resiliency when exposed to intense and prolonged irradiation. Conventional designs of springs to be attached to a grid strap do not provide for attachment at a location on the grid strap where a fuel rod in a standard cell is on one side of the strap without interfering with a control rod guide thimble in a thimble cell which is directly behind and on the other side of the grid strap.

SUMMARY OF THE INVENTION

Briefly stated, the invention is directed towards a nuclear fuel spacer grid having interleaved grid straps and a first type spring clip. The straps form standard cells enclosing fuel rods and thimble cells enclosing control rod guide thimbles, all in an egg crate configuration. The first or first type spring clip has an extended band which is bent to widthwise encircle the grid strap with the band's two ends attached together. The band has a spring portion compressibly contacting a fuel rod near one surface of the grid strap. The band also has a pair of separated generally flat portions straddling a control rod guide thimble near the other surface of the grid strap.

Preferably, the first spring clip is made from a material having good radiation stress relaxation properties, and the grid straps are made from a material having a low neutron capture cross-section.

BRIEF DESCRIPTION OF THE DRAWINGS

The subject matter of the invention is particularly pointed out and distinctly claimed in the concluding portion of this specification. The invention, however, both as to organization and method operation, together with further advantages thereof, may thus be understood by reference to the following description taken in connection with the accompanying drawings, in which:

DETAILED DESCRIPTION OF THE INVENTION

Reference will now be made in detail to a present preferred embodiment of the invention, an example of which is illustrated in the accompanying drawings.

Figure 1:
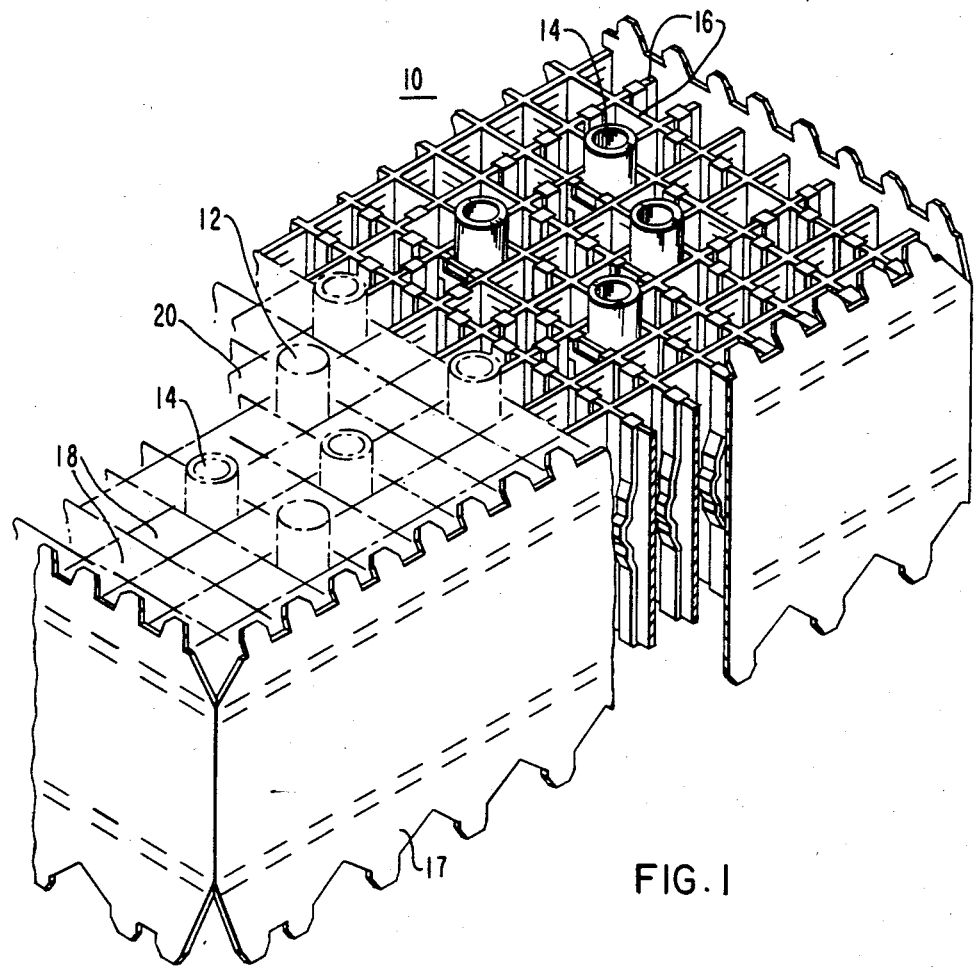
FIG. 1 is an isometric view, partially broken away, of a grid area.
Figure 2:
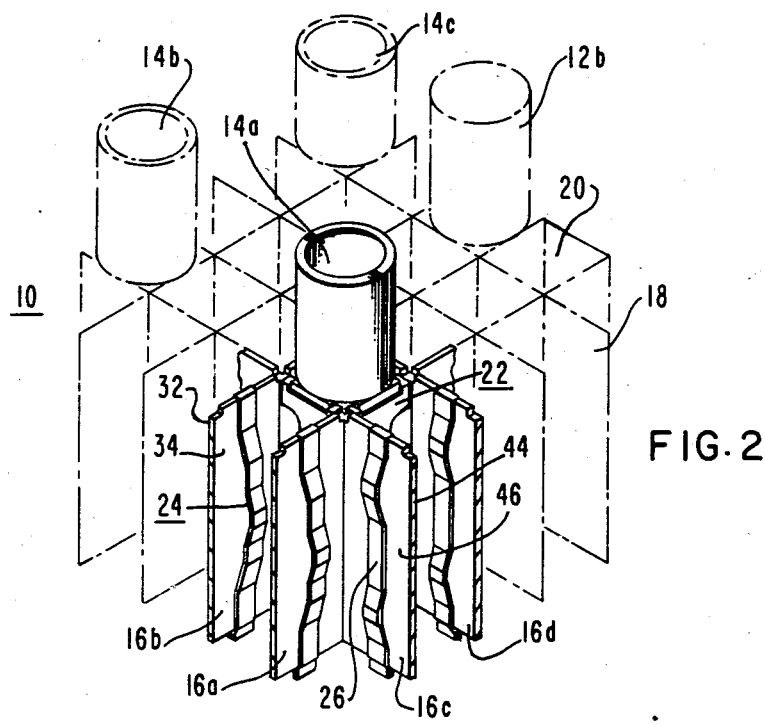
FIG. 2 is an enlarged view of a portion of FIG. 1 illustrating the invention.
Figure 4:
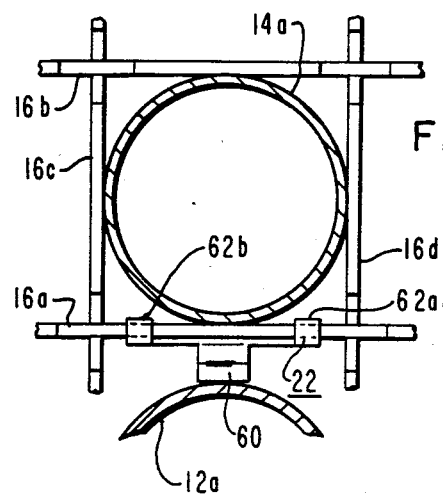
FIG. 4 is a top planar view of the first type spring clip and surrounding area illustrated in FIG. 1 and also including a portion of an associated fuel rod.
Figure 5:
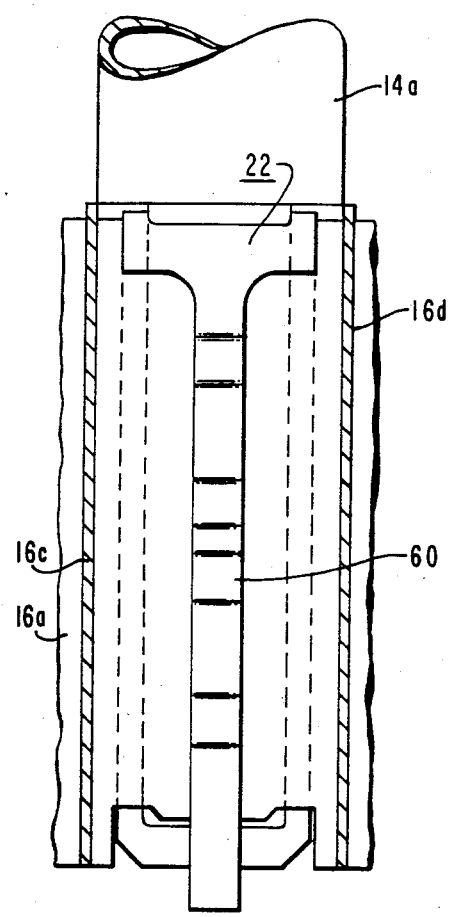
FIG. 5 is a front elevational view of the first type spring clip and surrounding area illustrated in FIG. 1.
Figure 6:
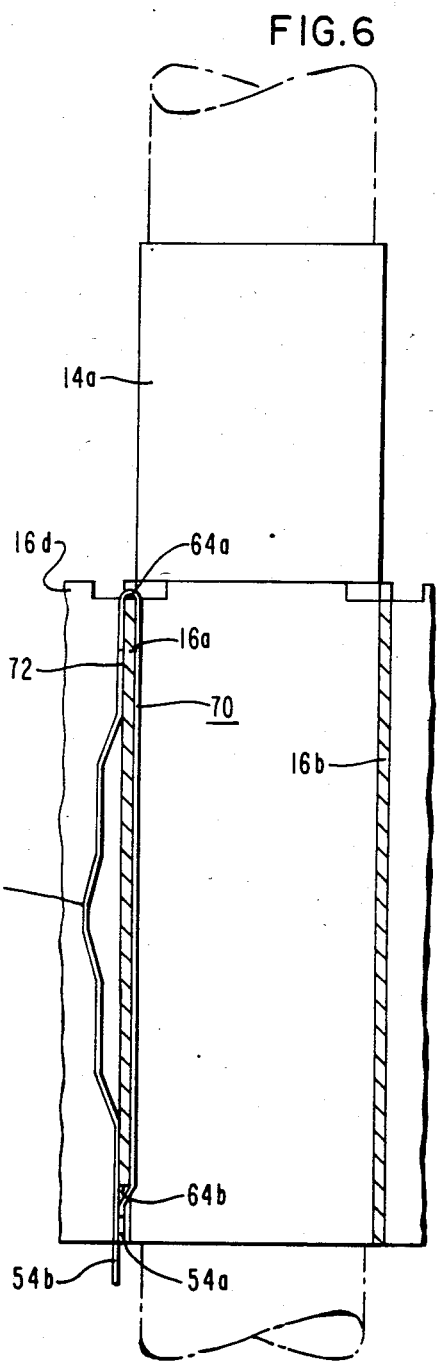
FIG. 6 is a side elevational view of the first type spring clip and surrounding area illustrated in FIG. 1.

In the drawings, like reference characters designate like or corresponding parts throughout the several views. There is shown in FIGS. 1 and 2 an area of a single nuclear reactor fuel assembly grid 10 which includes interleaved straps 16 (enclosed in a peripheral strap 17) which form an egg crate configuration array. The interleaved straps thus define an array of multiple standard cells 18 through which fuel rods 12 (only two of which are shown, for clarity, in FIG. 1 and only one in FIG. 2) are adapted to extend. Each standard cell surrounds one fuel rod. The grid 10 also provides for the spacing of the control rod guide thimbles 14. The straps 16 in their egg crate configuration also define thimble cells 20 to enclose the control rod guide thimbles 14. For example, in FIG. 4 control rod guide thimble 14a is seen within the thimble cell defined by straps 16a, 16b, 16c, and 16d. Each thimble cell surrounds one control rod guide thimble.

Figures 7, 8:
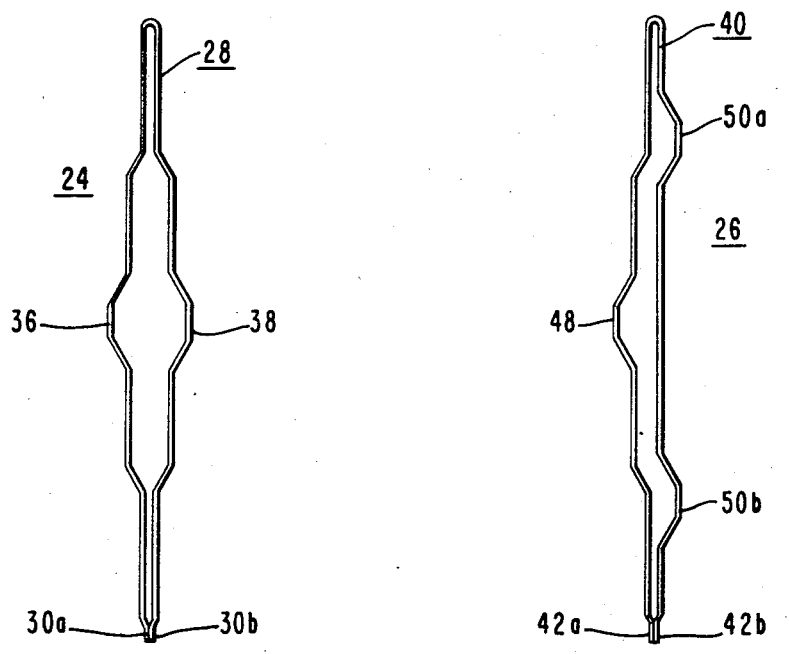
FIG. 7 is a side elevational view of a second type spring clip illustrated in FIG. 1.
FIG. 8 is a side elevational view of a third type spring clip illustrated in FIG. 1.

Each fuel rod 12 is held in place in the grid 10 by springs on two adjacent straps 16 forming part of a standard cell 18 and a pair of generally rigid, axially-spaced dimples on the other two adjacent straps 16 which complete the enclosure of a standard cell 18 to thereby provide a six-point support to each fuel rod. Other standard cell fuel rod support systems are possible and should have, at a minimum, at least one spring projecting into its associated standard cell to compressibly contact its associated fuel rod. Where a standard cell is adjacent a thimble cell, and the standard cell requires a spring on its side of their common grid strap, a first type or first spring clip 22 (also shown in FIGS. 3–6) is utilized. Where two adjacent standard cells require a spring on each side of their common grid strap, a second type or second spring clip 24 (also shown in FIG. 7) is employed. Where two adjacent standard cells require a spring on one side of their common grid strap and a pair of dimples on the other side, a third type or third spring clip 26 (also shown in FIG. 8) is used. For the case of a standard cell which is adjacent a thimble cell and which requires a pair of dimples on its side of their common grid strap, or for the case of two adjacent standard cells which require a pair of dimples on each side of their common grid strap, the grid strap is deformed (the deformation process being known by those skilled in the art) to create dimples which are integral with the grid strap itself. The same process is used to create dimples in the peripheral strap 17.

Preferably, the grid strap 16, including any integral dimples, are made from a material having a lower neutron capture cross-section than for the three types of spring clips 22, 24 and 26. Moreover, the three types of spring clips 22, 24 and 26 would be made of a material having better radiation stress relaxation properties than those of the grid straps 16. A preferred material for the grid straps 16 is Zircaloy, while a preferred material for the spring clips 22, 24 and 26 is a nickel-chrome-iron alloy.

Each control rod guide thimble 20 is attached to the grid 10 by spot welding. If the control rod guide thimble 20 is not weld compatible with the grid 10, the guide thimble 20 is bulge fitted to a short sleeve, not shown in the drawings, which is spot welded to the grid 10, as is known by those skilled in the art.

The first type of spring clip 22 (shown in more detail in FIGS. 3-6) has an elongated band 52 which is bent, preferably at its middle equidistant from its two ends 54a and 54b, to widthwise encircle a first grid strap 16a and which has its two ends 54a and 54b attached together. Preferably, the middle of the band 52 is located near one of two lengthwise edges 64a of the first grid strap 16a, and the ends 54a and 54b of the band 52 are welded together and are located near the other of the two lengthwise edges 64b of the first grid strap 16a. Such an attachment system allows for easy replacement of damaged spring clips on the grid strap. The welding of the ends of the spring clip (band) provides for a more secure attachment than with other kinds of conventional spring clips which use non-welding attachment means. Preferably, the spring clips are attached to the grid straps before the grid straps are assembled in the egg crate configuration of the grid.

The band 52 has a spring portion 60 and a pair of spaced-apart, generally flat portions 62a and 62b. The spring portion 60 is located near one surface 56 of the first grid strap 16a to compressibly contact one of the fuel rods 12a. The flat portions 62a and 62b are located near the other surface 58 of the first grid strap 16a to straddle one of the control rod guide thimbles 14a (if the guide thimble had a previously-mentioned sleeve, the flat portions would also straddle the sleeve). In this way the first spring clip 22 provides a spring for a fuel rod on one side of a grid strap without interfering with a control rod guide thimble on the other side of the grid strap.

In a preferred embodiment of the first spring clip 22, the band 52 has coextensive first and second segments, with the first segment 70 extending from one of the band's two ends 54a to its middle, and the second segment 72 extending from that middle to the other of the band's two ends 54b. The first segment 70 is located generally within a thimble cell having a first control rod guide thimble 14a, and the second segment 72 is located generally within a standard cell having a first fuel rod 12a.

The first segment 70 has the previously mentioned flat portions 62a and 62b which are located near the first grid strap 16a, which are spaced apart on either side of the first control rod guide thimble 14a and on either side of that thimble's general line of contact with the first grid strap 16a, and which are generally parallel to and at least as long as that contact line. The second segment 72 has the previously mentioned spring portion 60 which is generally parallel to the longitudinal axis of the first fuel rod 12a and compressibly contacts that fuel rod by projecting generally perpendicularly away from the first grid strap 16a toward the fuel rod's longitudinal axis.

The band 52 also has two joining members 66 and 68 with the first segment 70 having the first joining member 66 and the second segment 72 having the second joining member 68. The second joining member 68 coextensively connects the first segment's two flat portions 62a and 62b, near the one lengthwise edge 64a of the first grid strap 16a, with the second segment's spring portion 60. The second joining member 68 is seen to be roughly "Y" or "T" shaped with its leg attached to the spring portion 60 and with its arms bent around the one lengthwise edge 64a of the first grid strap 16a to connect with the flat portions 62a and 62b. This arrangement avoids interference with a first control rod guide thimble 14a.

The first joining member 66 coextensively connects with the first segment's two flat portions 62a and 62b near the other lengthwise edge 64b of the first grid strap 16a, and the first joining member 66 extends to the one end 54a of the band 52 which makes up the first type or first spring clip 22. It should be noted that the spring portion 60 extends to the other end 54b of the band 52. The first joining member 66 is positioned axially along the longitudinal axis of the first control rod guide thimble 14a at a distance generally beyond the other lengthwise edge 64b, and it is positioned transversely or radially from that longitudinal axis at a distance greater than that of the outside diameter of the first control rod guide thimble 14a. The first joining member 66 is seen to be roughly "Y" or "T" shaped with its leg extending to the one end 54a of the band 52 and with its arms bent at their tips to connect with the two flat portions 62a and 62b near the other lengthwise edge 64b of the first grid strap 16a, while avoiding interference with the first control rod guide thimble 14a.

Figure 3:
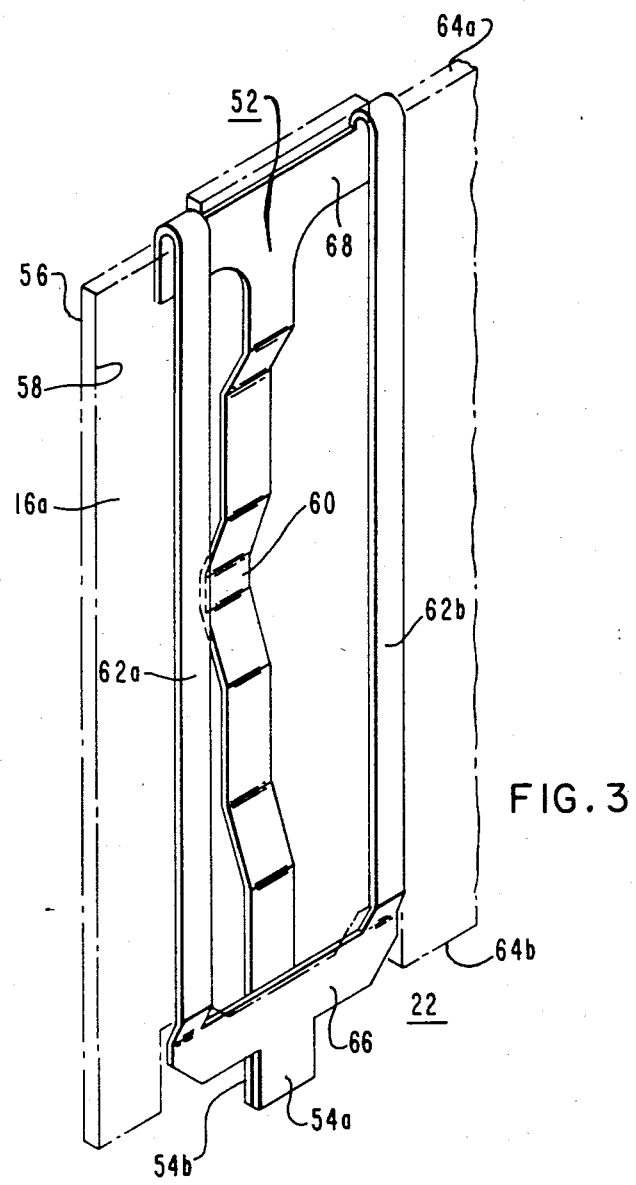
FIG. 3 is an isometric view of a first type spring clip and grid strap portion illustrated in FIG. 1.

With this preferred embodiment of the first or first type spring clip 22, it is recommended that it be attached to a first grid strap 16a having notches in its lengthwise edges 64a and 64b (as shown in FIG. 3) to help hold the spring clip (band 52) in position on the grid strap. When notches are present, reference to a spring clip joining member (or the like) bending around or extending beyond a lengthwise edge of a grid strap means bending around or extending beyond the notch area of the lengthwise edge.

The second type of spring clip 24 (shown in more detail in FIGS. 2 and 7) has an extended belt 28 which is bent to widthwise encircle a second grid strap 16b (having two faces 32 and 34) and which has its two end parts 30a and 30b attached together, such as by welding. The belt 28 has a first spring 36 and a second spring 38. The first spring 36 is located near the one face 32 of the second grid strap 16b, and the second spring 38 is located near the other face 34.

The third type of spring clip 26 (shown in more detail in FIGS. 2 and 8) has an extended strip 40 which is bent to widthwise encircle a third grid strap 16c (having two sides 44 and 46) and which has its two end portions 42a and 42b attached together, such as by welding. The strip 40 has a third spring 48 and a pair of dimples 50a and 50b. The third spring 48 is located near the one side 44 of the third grid strap 16c, and the pair of dimples 50a and 50b is located near the other side 46. With the second 24 or third 26 type spring clip, it likewise is recommended that they be attached to grid straps having notches (not shown) in their lengthwise edges to help hold them in position on the grid straps. Alternately, the end parts or end portions may be welded to coolant mixing vanes (not shown) projecting from the bottom of the grid straps.

A complete nuclear reactor fuel assembly spacer grid will typically have a multiplicity of first, second, and third type spring clips with any particular grid strap having a plurality of spring clips (including the use of more than one type) to satisfy the need of each fuel rod in a standard cell for a spring/dimple support and the need of each control rod guide thimble in a thimble cell for noninterference from the spring clips.

It will be apparent that many modifications and variations are possible in light of the above teachings. It, therefore, is to be understood that within the scope of the appended claims, the invention may be practiced other than as specifically described.

I claim:

1. A grid for the spacing of fuel rods and control rod guide thimbles in a nuclear reactor fuel assembly, comprising:
   (a) a plurality of interleaved grid straps arranged in an egg crate configuration defining standard cells therein for the separate enclosure of each of said fuel rods and defining thimble cells therein for the separate enclosure of each of said control rod guide thimbles; and
   (b) a first spring clip having an elongated band with two ends, coextensive first and second segments, and a middle equidistant from said two ends dividing said band into said first and second segments, with said band bent at said middle and disposed to widthwise encircle a first grid strap having two lengthwise edges, with said middle proximate one of said two lengthwise edges, and with said two ends attached together and disposed proximate the other of said two lengthwise edges;
      (i) said first segment extending between said middle and one of said two ends and disposed generally within a first said thimble cell having a first said control rod guide thimble, with a first longitudinal axis and an outside diameter, contacting said first grid strap generally along a contact line, said first segment having two generally flat portions disposed proximate said first grid strap, spaced apart on either side of said control rod guide thimble and said contact line, and disposed generally parallel to and having a length at least equal to said contact line;
      (ii) said second segment extending between said middle and the other of said two ends and disposed generally within a first said standard cell having a first said fuel rod with a second longitudinal axis, said second segment having a spring portion disposed generally parallel to said second longitudinal axis and projecting generally perpendicularly away from said first grid strap toward said second longitudinal axis with said spring portion compressibly contacting said first fuel rod;
      (iii) said second segment also having a second joining member coextensively connecting said two flat portions of said first segment proximate said one of said two lengthwise edges with said spring portion of said second segment; and
      (iv) said first segment also having a first joining member which coextensively joins with said two flat portions of said first segment proximate said other of said two lengthwise edges and which extends to said one of said two ends, wherein said first joining member is axially disposed along said first longitudinal axis generally beyond said other of said two lengthwise edges and transversely disposed from said first longitudinal axis at a distance greater than that of said outside diameter of said first control rod guide thimble.

2. The grid of claim 1, wherein said two ends are welded together.

3. The grid of claim 1, also including a second spring clip having an extended belt with two end parts, said belt bent to widthwise encircle a second said grid strap having two faces, with said two end parts attached together and with said belt having a first spring proximate one of said two faces and a second spring proximate the other of said two faces.

4. The grid of claim 3, also including a third spring clip having an extended strip with two end portions, said strip bent to widthwise encircle a third said grid strap having two sides, with said two end portions attached together and with said strip having a third spring proximate one of said two sides and a pair of dimples proximate the other of said two sides.

5. The grid of claim 12, wherein said grid straps comprise a first material having a lower neutron capture cross-section than that of said first spring clip and wherein said first spring clip comprises a second material having better radiation stress relaxation properties than those of said grid straps.

6. The grid of claim 5, wherein said first material is Zircaloy and said second material is a nickel-chrome-iron alloy.

* * * * *